US008936138B2

(12) United States Patent
Morris et al.

(10) Patent No.: US 8,936,138 B2
(45) Date of Patent: Jan. 20, 2015

(54) DISC BRAKE

(75) Inventors: Jason Morris, Neath & Port Talbot (GB); Paul Roberts, Newport (GB); Norman Breakwell, Torfaen (GB); Peter K. Gibbens, Newport (GB); Martin P. Taylor, Newport (GB); Avinash Ullagaddi, Karnataka (IN); Darshan Pateel, Karnataka (IN); Sanjeev Kulkarni, Karnataka (IN); Kishan Kumar Udupi, Karnataka (IN)

(73) Assignee: Meritor Heavy Vehicle Braking Systems (UK) Limited, Monmouthshire (GB)

( * ) Notice: Subject to any disclaimer, the term of this patent is extended or adjusted under 35 U.S.C. 154(b) by 543 days.

(21) Appl. No.: 13/116,260

(22) Filed: May 26, 2011

(65) Prior Publication Data
US 2012/0298456 A1 Nov. 29, 2012

(30) Foreign Application Priority Data

Jun. 1, 2010 (GB) .................................. 1009030.6

(51) Int. Cl.
*F16D 65/00* (2006.01)
*F16D 55/226* (2006.01)
*F16D 65/38* (2006.01)
*F16D 55/00* (2006.01)

(52) U.S. Cl.
CPC ...... *F16D 55/226* (2013.01); *F16D 2055/0008* (2013.01); *F16D 2005/0079* (2013.01)
USPC ..................... 188/73.1; 188/71.7; 188/250 B; 188/73.31

(58) Field of Classification Search
USPC ........... 188/73.1, 73.35, 73.36, 73.37, 250 R, 188/250 B, 250 G, 72.5, 73.31, 71.7
See application file for complete search history.

(56) References Cited

U.S. PATENT DOCUMENTS

| 3,166,157 A | | 1/1965 | Burnett | |
|---|---|---|---|---|
| 3,422,935 A | * | 1/1969 | Van House | 188/73.43 |
| 4,053,031 A | * | 10/1977 | Thioux | 188/71.9 |

(Continued)

FOREIGN PATENT DOCUMENTS

| JP | 932870 A | | 2/1997 |
|---|---|---|---|
| JP | 9032870 A | | 2/1997 |
| SU | 1196556 A | * | 12/1985 |

OTHER PUBLICATIONS

European Search Report for European Application No. 11167642.5, mailed Oct. 4, 2011, 6 pages.

(Continued)

*Primary Examiner* — Melody Burch
(74) *Attorney, Agent, or Firm* — Brooks Kushman P.C.

(57) ABSTRACT

A disc brake includes a brake disc, a sliding caliper, a single piston, and a brake pad carrier comprising a leading part and a trailing part. The brake pad carrier includes mounting features for securing the brake pad carrier to an associated structure of a vehicle. The mounting features define a mounting side and a non-mounting side of the brake. A mounting side brake pad comprises mounting side friction material and a non-mounting side brake pad comprising non-mounting side friction material. The center of pressure of the non-mounting side friction material is circumferentially aligned with the piston and the center of pressure of the mounting side friction material is offset in relation to the piston towards the leading part of the brake pad carrier.

11 Claims, 4 Drawing Sheets

(56) References Cited

U.S. PATENT DOCUMENTS

| | | | |
|---|---|---|---|
| 4,533,025 A * | 8/1985 | Carre | 188/73.44 |
| 4,632,227 A * | 12/1986 | Mery et al. | 188/73.32 |
| 5,022,500 A | 6/1991 | Wang | |
| 5,386,890 A | 2/1995 | Itsuaki | |
| 7,461,725 B2 | 12/2008 | Kloos et al. | |
| 2007/0256900 A1 * | 11/2007 | Kloos et al. | 188/71.3 |
| 2010/0109427 A1 * | 5/2010 | Baumann | 303/9.75 |

OTHER PUBLICATIONS

European Search Report dated Oct. 4, 2011.

* cited by examiner

DISC BRAKE

RELATED APPLICATION

This application claims priority to GB Patent Application 1009030.6, filed Jun. 1, 2010.

FIELD OF THE INVENTION

This invention relates to a disc brake, in particular an air actuated disc brake, for a commercial vehicle.

BACKGROUND

Disc brakes are commonly used on both commercial (heavy) and private (light) vehicles. Some are hydraulically operated, while others are air operated. Some disc brakes are operated by pistons acting on one side of the brake. Due to vehicle space limitations it is common to mount such pistons on the inboard side of the wheel in question, as there is generally more space inboard than outboard of a vehicle's brake disc.

Certain disc brake pads wear in a tapered manner. Thus a leading edge of an outboard brake pad and an inboard brake pad will wear more than the trailing edge of those brake pads.

It is known to counter the problem of tangential taper wear by offsetting the inboard pad in the direction of its leading edge and offsetting the outboard pad in the direction of the trailing edge. Such offset pads can be seen in U.S. Pat. No. 3,422,935 (Van House). Moving the pads in this way counters the rotational forces and balances the pads against the brake disc more evenly. A similar arrangement can be seen in U.S. Pat. No. 4,533,025 (Carré). U.S. Pat. No. 3,422,935 does not differentiate between wear on the inboard and outboard pads, referring only to tapered lining wear of both pads. U.S. Pat. No. 3,422,935 maintains that offsetting both pads in this way will lead to equal and opposite force couples around the point where the braking force is applied. U.S. Pat. No. 4,533,025 also refers to the correction of tapering wear of each brake pad.

Offsetting of the inboard pad in the leading direction moves the center of pressure of that pad in the leading direction and hence the center of pressure of the reaction force of the disc in the leading direction. Offsetting the outboard pad in the trailing direction offsets the center of pressure of the outboard brake pad in the trailing direction, hence offsetting the reaction force of the disc against the outboard pad in the trailing direction. The pads therefore create a couple on the disc. The offset center of pressure of the inboard and outboard brake pads also creates unequal forces in the caliper bridge.

U.S. Pat. No. 5,022,500 shows an arrangement wherein the mounting side brake pad has no offset in relation to the piston but the non-mounting side brake pad is offset towards the trailing edge.

JP932870 FIG. 1 shows a mounting side brake pad offset towards the leading edge with respect to the piston and a non-mounting side brake pad offset towards the leading edge with respect to the piston. In FIG. 3 of JP932870 the mounting side brake pad is offset towards a leading edge whereas the non-mounting side brake pad is offset towards a trailing edge with respect to the piston.

FIG. 1 of U.S. Pat. No. 5,386,890 shows mounting side brake pad offset towards the trailing edge with respect to the single piston.

All of the above documents relate to hydraulic brakes on light vehicles such as cars. An advantage of such brakes is their size and weight in comparison to those used on commercial vehicles such as lorries and trucks. Manipulating these smaller, lighter brakes, for example when changing brake pads, is much easier than performing the same operation with their commercial counterparts. The calipers of light vehicles can be partially unscrewed and manually raised away from the disc in order to allow the replacement of brake pads. It does not matter, therefore, if the bridge arm of the caliper or carrier normally impedes access to the brake pads. In contrast, the brake pads of commercial vehicles should be accessible without the need for removal or manipulation of the much heavier carriers used (since these carriers are so heavy that they cannot safely be manually handled by a single person), and hence they incorporate spaced caliper bridge arms between which the pads can be removed and replaced without having to disturb the caliper fixings.

Because commercial vehicle brakes have to withstand far higher forces, they tend to be heavier. Typically a commercial vehicle brake might include one or more, or all, of the following features:

a) a fixed carrier which reacts the tangential (braking) forces from both the mounting side pad and the non-mounting side pad, b) a sliding caliper which is designed to apply forces to the mounting side brake pad and non-mounting side brake pad so that the brake disk is clamped and therefore braked, c) the floating caliper acting so as to not transfer the tangential braking loads to the vehicle (this function being carried out by the fixed carrier), d) mounting side and non-mounting side brake pads which are removable through spaced arms of the carrier, e) mounting side and non-mounting side brake pads which are removable through spaced arms of the caliper.

Tapering pad wear can also occur on heavy vehicle brakes, for example commercial vehicle brakes such as those used on lorries and trucks.

US2007/0256900 shows a mounting side brake pad aligned with the piston and a non-mounting side brake pad offset towards a trailing edge. U.S. Pat. No. 7,461,725 is similar in this respect.

What is required is a way to reduce tangential tapering wear of the mounting side pad (e.g. the inboard side pad when the brake operating piston is mounted on the inboard side of the brake disc) of a commercial disc brake that minimizes the creation of imbalanced forces in the brake caliper or in the brake disc, in particular in the spaced bridge arms. This is particularly important since the clamp forces involved when using commercial vehicle disc brakes are far higher than the clamp forces involved on disc brakes of lighter vehicles such as cars and motorcycles.

SUMMARY

An air operated disc brake comprises a brake disc, a sliding caliper, a single piston, and a brake pad carrier comprising a leading part and a trailing part determined by the usual direction of rotation of the brake disc. The brake pad carrier includes mounting features for securing the brake pad carrier to an associated structure of a vehicle. The mounting features defines a mounting side and a non-mounting side of the brake. A mounting side brake pad comprises mounting side friction material and a non-mounting side brake pad comprises non-mounting side friction material. The non-mounting side friction material is circumferentially aligned with the piston and the mounting side friction material is offset in relation to the piston towards the carrier leading part.

Advantageously, this arrangement of the non-mounting side and mounting side pads in relation to the piston counters rotation of the mounting side pad due to the points at which forces are applied, and thus also counters tangential wear at its leading edge. The location of the non-mounting side pad prevents an imbalance of force from occurring.

There is also provided a method of manufacturing a first and second brake pad carrier comprising the steps of:

creating a carrier mold;

casting first and second carrier castings from said mold;

machining said first carrier casting such that a first brake pad aperture is offset in relation to a second brake pad aperture to form a first carrier;

machining said second carrier casting such that a third brake pad aperture is offset in relation to a fourth brake pad aperture to form a second carrier; and wherein the position of the first and second brake pad apertures on the first carrier is a mirror image of the position of the third and fourth brake pad apertures on the second carrier.

Advantageously, this method reduces manufacturing costs by using the same molds for left and right side carriers, despite the required difference between them.

The carrier may be configured as a fixed carrier operable to transfer brake torque forces from a mounting side brake pad and a non-mounting side brake pad to other vehicle structures. The caliper may be a sliding caliper.

These and other features of the present invention can be best understood from the following specification and drawings, of which the following is a brief description.

DETAILED DESCRIPTION

Heavy vehicles such as commercial trucks have a usual (forward) direction of travel. In the following description the terms "leading" and "trailing" refer to parts of the brake assuming the usual direction of rotation of a brake disc, i.e. that of a vehicle moving forward rather than in reverse. The amount of time spent travelling in the reverse direction is minimal in comparison to that spent travelling forwards (and is at much lower speeds).

Figure 1:
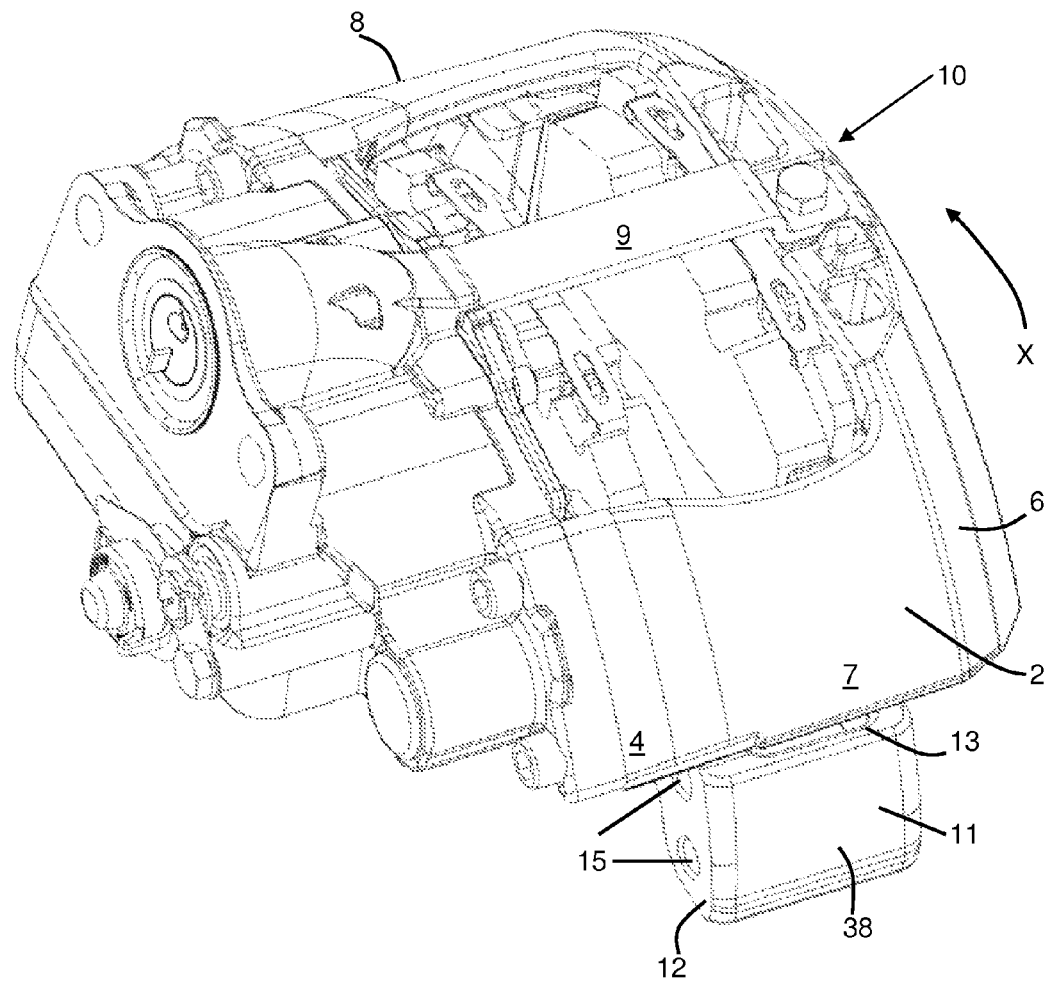
FIG. 1 is a perspective view of a disc brake assembly according to the present invention.

FIG. 1 shows part of a disc brake assembly 10 comprising a sliding caliper 2 mounted on a carrier 11 which is in turn mounted on a suspension component of a vehicle (not shown). The caliper 2 comprises an inboard side 4 and an outboard side 6. The inboard and outboard sides 4, 6 are connected by a leading bridge arm 7 and a trailing bridge arm 8. The bridge arms 7, 8 are positioned at either end of the caliper 2, leaving an aperture substantially extending along a length of the brake pads.

Figure 2:
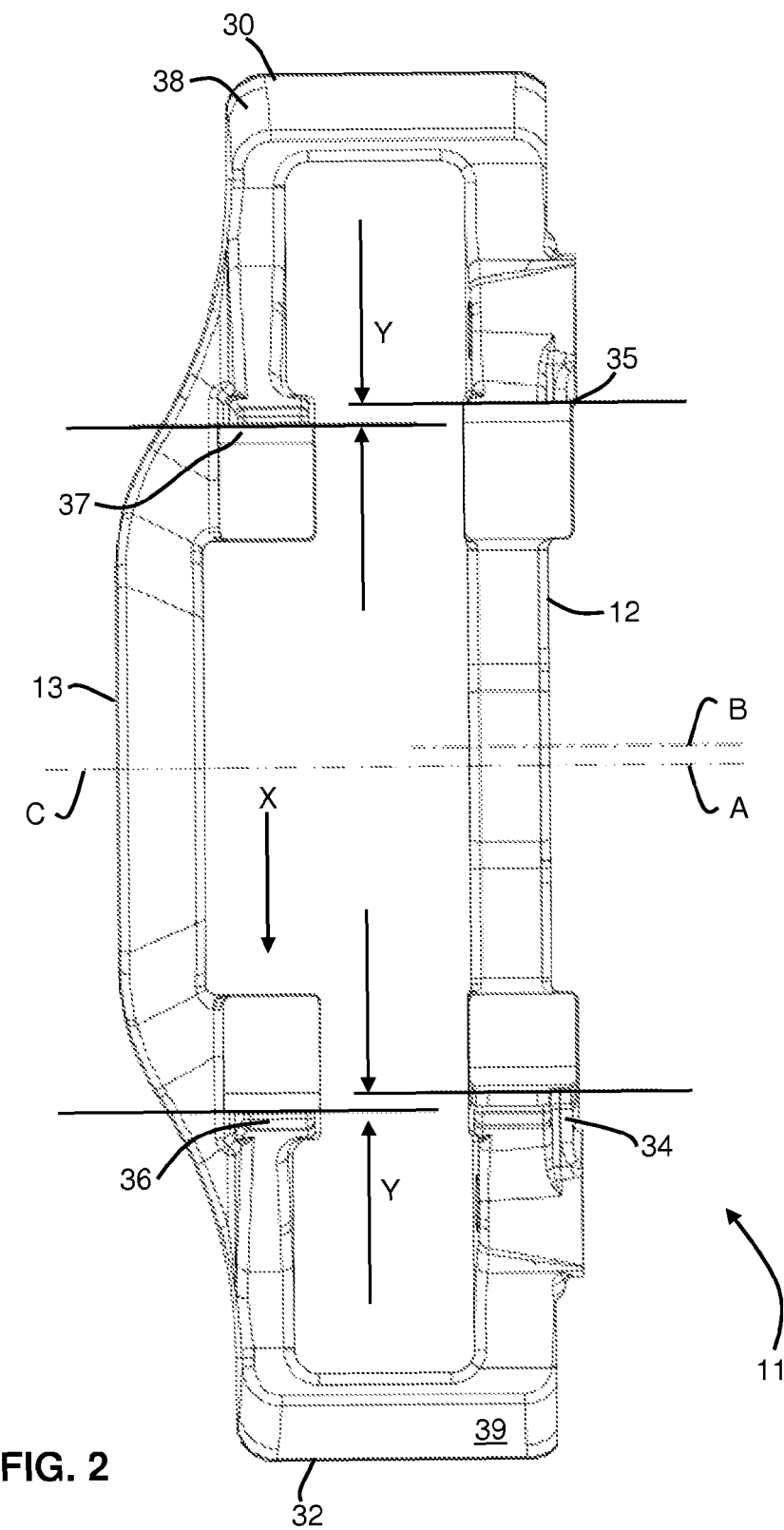
FIG. 2 is a plan view of a carrier of the disc brake assembly FIG. 1.
Figure 3:
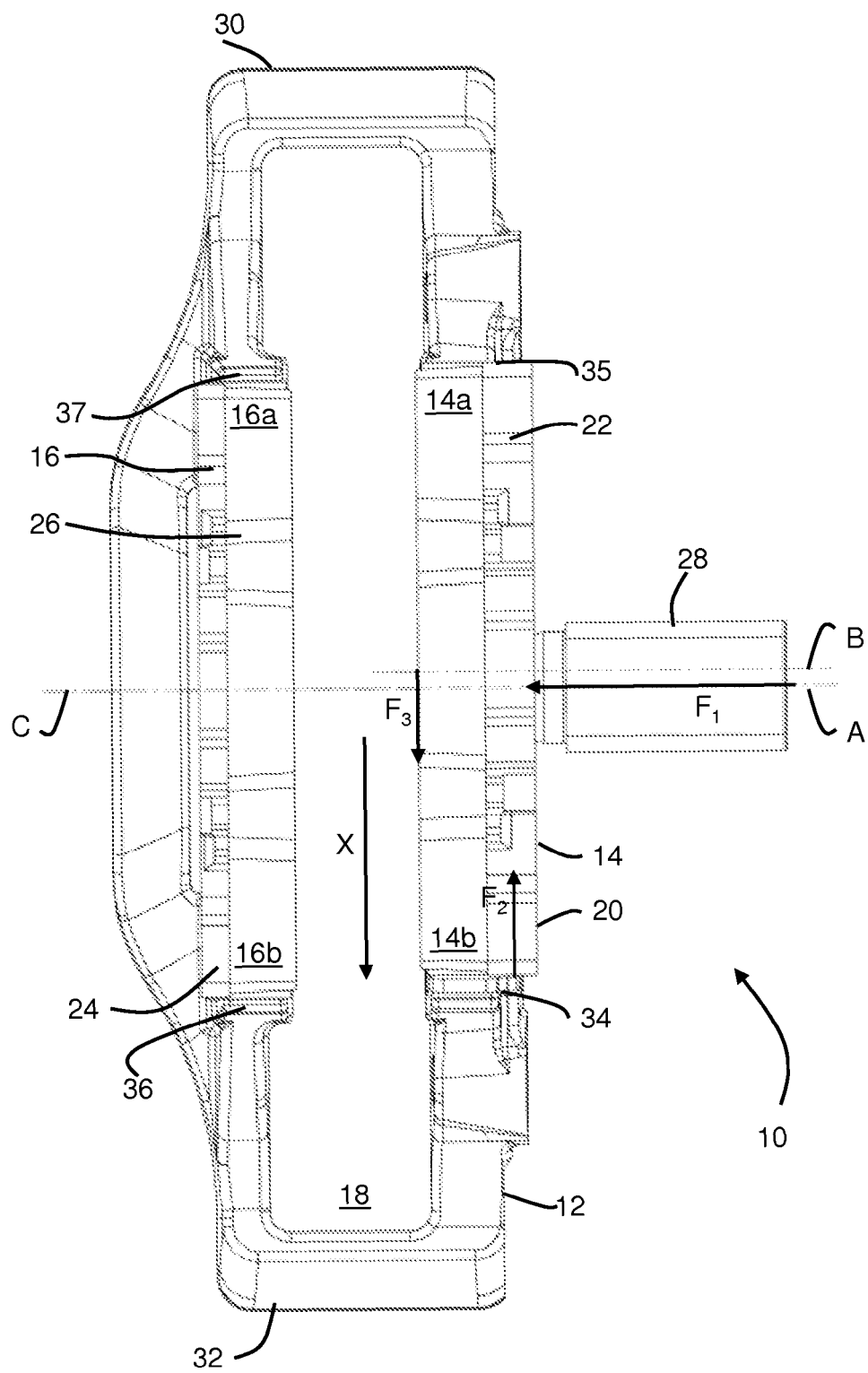
FIG. 3 is a plan view of the carrier of FIG. 2 with brake pads and a piston.

The carrier 11, as shown in FIGS. 2 and 3, comprises an inboard side 12 and an outboard side 13, the two sides being joined by a leading carrier bridge arm 38 and a trailing carrier bridge arm 39. The inboard side 12 of the carrier 11 includes fixing holes 15 (FIG. 1) used for attaching (or mounting) the carrier onto a vehicle (not shown). The fixing holes 15 define the "mounting" side of the brake. In this case the mounting side is the inboard side. The side of the brake opposite the mounting side is known as the non-mounting side, which in this case is the outboard side. The carrier bridge arms 38, 39 are positioned at either end of the carrier 11, and extend beyond and below the caliper bridge arms 7, 8. The arms are spaced sufficiently far apart so as to be able to remove the inboard and outboard pads 14, 16 from between the arms. The carrier 11 further comprises an inboard leading abutment 35 and an inboard trailing abutment 34, as well an outboard leading abutment 37 and an outboard trailing abutment 36. The inboard brake pad 14 fits between the inboard abutments 34, 35 and the outboard brake pad 16 fits between the outboard abutments 36, 37.

The inboard brake pad 14 comprises a back plate 20 and frictional material 22, and has a leading edge 14a and a trailing edge 14b. Similarly, the outboard brake pad 16 comprises a back plate 24 and friction material 26, and has a leading edge 16a and a trailing edge 16b. The inboard back plate 20 in this embodiment is thicker than the outboard back plate 24.

Figure 4:
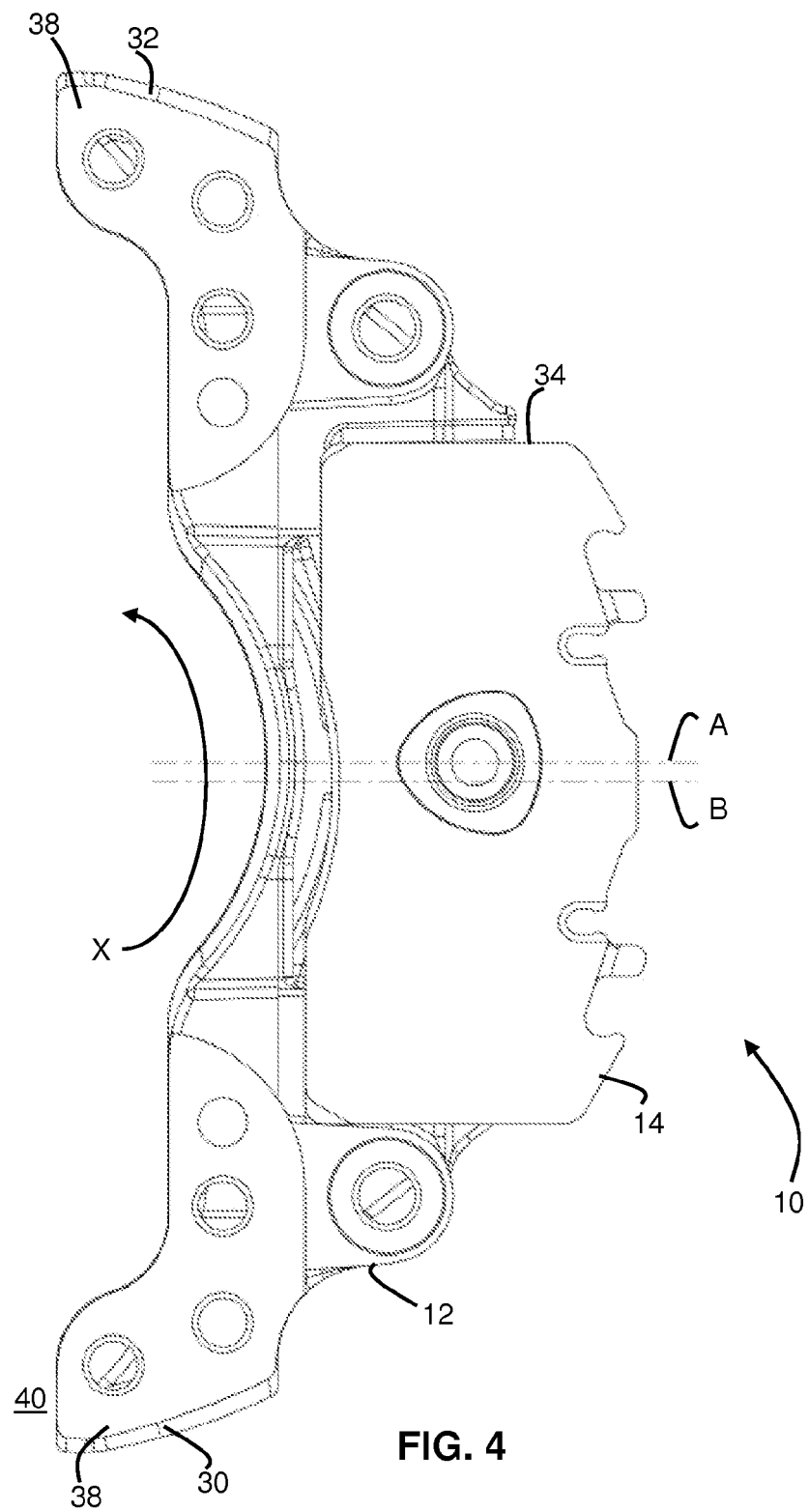
FIG. 4 is a side view of the embodiment of FIG. 3 with a brake disc, taken in the direction of arrow O, showing a mounting side pad.

FIG. 4 shows a brake disc 40 positioned in the aperture 18 (see FIG. 3) defined between the two brake pads 14, 16. In operation, a braking force is applied by an air-operated piston 28 (see FIG. 3), moving the inboard brake pad 14 outboard until it comes into contact with the brake disc 40. The piston 28 continues to apply a braking force, causing reaction forces to slide the caliper 2 inboard along pins (not shown) until the outboard brake pad 16 contacts the brake disc 40.

When a vehicle is moving forwards, the brake disc 40 is turning in the direction indicated by the arrow X of FIGS. 1, 2, 3 and 4, defining a leading part 30 and a trailing part 32 of the carrier 11. The centerline A of the piston 28 is aligned with the centerline C of the outboard brake pad 16. The centerline B of the inboard pad 14 is offset with respect to the centerline A in the direction of the leading part 30 of the carrier 11. In order to create this offset the inboard side abutments 34, 35 are offset 5 mm in relation to the outboard side abutments 36, 37 respectively.

As shown in FIG. 3, the force $F_1$ from the piston acts on the inboard back plate 20 to apply the brakes. Note the force $F_1$ is applied over a relatively small area (the piston area) to the back plate 20. This creates a friction force at $F_3$ as the inboard brake pad bears against the disc brake 40. The friction force $F_3$ is reacted by force $F_2$ created by abutment 34. It can be seen from FIGS. 3 and 4 that moving the centerline B of the inboard brake pad 14 towards the leading edge relative to the centerline A of the piston 28 will go some way to countering rotation of the inboard brake pad 14 in a counter-clockwise direction (when viewing FIG. 3) and will thus reduce tangential taper wear at the leading edge.

It can be seen in FIG. 2 that in order to accommodate the offset inboard brake pad 14, the abutments 34, 35 on the inboard side of the carrier 11 have been moved a distance Y towards the leading part 30 of the carrier 11 in relation to the abutments 36, 37 on the outboard side of the carrier 11. In the present embodiment the distance Y is 5 mm. In other embodiments, this distance may be varied between 3 mm and 15 mm, alternatively between 3 mm and 10 mm. The optimum offset distance depends largely on the size of the disc brake pad.

As the inboard brake pad 14 engages the brake disk 4, the caliper 11 moves inboard drawing with it the caliper outboard side 6 which in turn causes the outboard brake pad 16 to move inwardly and ultimately to engage and brake the outboard side of the brake disk 40. Significantly, the caliper outboard side 6 engages the outboard brake pad 16 over substantially the entire area of the outboard back plate 24. Because the outboard brake pad 16 is being pushed onto the brake disk 40 over substantially the entire area of the outboard back plate 24, then the tendency of the outboard brake pad 16 to taper wear as a result of tipping is significantly reduced. Significantly, because the outboard brake pad back plate 24 reacts against the abutment 36 and because the outboard back plate 24 is thinner than the inboard back plate 20, then the distance between the reactional force created by abutment 36 and the outboard side of the brake disk 40 is less than the distance between $F_2$ and $F_3$ on the inboard side. As such, because the outboard brake pad back plate 16 is thinner than the inboard brake pad back plate 20 then the tendency of the outboard brake pad 16 to tip as a result of reactional forces is less than on the inboard side. Thus, the difference in thickness between the inboard brake pad back plate 20 and outboard brake pad back plate 24 contributes to reducing taper wear on the outboard brake pad 16.

Due to the positioning of the caliper bridge arms 7, 8 and the carrier bridge arms 38, 39, the brake pads 14, 16 can easily be removed from the carrier 11 with no need for dismantling of the carrier. A strap 9, shown in FIG. 1, is provided to prevent dislodging of the brake pads 14, 16 when in use.

FIGS. 1 to 4 show a disc brake arrangement for the right-hand side of a vehicle.

Where a vehicle is fitted with both right and left hand brakes, the right hand brake can be as shown in FIGS. 1 to 4. However, the left hand brake would require a mirror image version of the pad abutments of the carrier 11. However, it is not necessary for there to be a mirror image version of the caliper 2 fitted to the left hand side of the vehicle.

Advantageously, carriers suitable for fitting to the right and left hand side of the vehicle can be economically produced as follows:

A mold is first produced, and then two identical carrier castings are cast from the mold. The first carrier casting is machined to provide a right hand carrier and the second carrier casting is machined to provide a left hand carrier.

The right hand carrier will have the pad abutments machined appropriately to provide a right hand carrier whereas the left hand carrier casting will have the pad abutments machined differently, thereby providing a left hand carrier. The position of the pad abutments on the right hand carrier will be at a mirror image position when considering the left hand carrier. Note in particular it is not necessary for the right and left hand carriers to be mirror images of each other, all that is required is that the position of the pad abutments on the right hand carrier are a mirror image of the position of the pad abutments on the left hand carrier.

Thus, the right and left hand carriers may be identical other than the mirror image positioning of the pad abutments. As such, it is possible to use identical calipers on both the right and left hand side of the vehicle (it is not necessary to use mirror image (or opposite handed) versions of the caliper on the right and left hand sides).

Although an embodiment of this invention has been disclosed, a worker of ordinary skill in this art would recognize that certain modifications would come within the scope of this invention. For that reason, the following claims should be studied to determine the true scope and content of this invention.

What is claimed is:
1. An air operated disc brake comprising:
 a brake disc;
 a sliding caliper;
 a single piston;
 a brake pad carrier comprising a leading part and a trailing part, the brake pad carrier including mounting features for securing the brake pad carrier to an associated structure of a vehicle, the mounting features defining a mounting side and a non-mounting side of the air operated disc brake; and
 a mounting side brake pad comprising mounting side friction material and a non-mounting side brake pad comprising non-mounting side friction material, wherein the non-mounting side friction material is circumferentially aligned with the piston and the mounting side friction material is offset in relation to the piston towards the leading part of the brake pad carrier.

2. The air operated disc brake according to claim 1, wherein the mounting side brake pad further comprises a mounting side back plate offset in relation to the piston towards the leading part of the brake pad carrier.

3. The air operated disc brake according to claim 2, wherein the non-mounting side brake pad further comprises a non-mounting side back plate circumferentially aligned with the piston.

4. The air operated disc brake according to claim 3, wherein the brake pad carrier comprises mounting side abutments configured to receive the mounting side back plate, and non-mounting side abutments configured to receive the non-mounting side back plate, and wherein the mounting side abutments are offset in relation to the non-mounting side abutments towards the leading part of the brake pad carrier.

5. The air operated disc brake according to claim 3, wherein the mounting side back plate is thicker than the non-mounting side back plate.

6. The air operated disc brake according to claim 1, wherein the mounting side friction material is offset by a distance of between 3 mm and 15 mm.

7. The air operated disc brake according to claim 6, wherein the mounting side friction material is offset by a distance of between 3 mm and 10 mm.

8. The air operated disc brake according to claim 1, wherein the brake pad carrier comprises spaced carrier bridge arms configured to allow the mounting side brake pad and the non-mounting side brake pad to be inserted into and removed from the brake pad carrier.

9. The air operated disc brake according to claim 8, wherein the sliding caliper includes spaced caliper bridge arms configured to allow the mounting side brake pad and the non-mounting side brake pad to be inserted into and removed from the brake pad carrier.

10. A vehicle comprising:
 a first air operated disc brake mounted on a first side of the vehicle; and
 a second air operated disc brake mounted on a second side of the vehicle opposite the first side of the vehicle, and wherein the first and second air operated disc brakes each comprise a brake disc, a sliding caliper, a single piston, a brake pad carrier comprising a leading part and a trailing part, the brake pad carrier including mounting features for securing the brake pad carrier to an associated structure of a vehicle, the mounting features defining a mounting side and a non-mounting side of the air operated disc brake, and a mounting side brake pad comprising mounting side friction material and a non-mounting side brake pad comprising non-mounting side friction material, wherein the non-mounting side friction material is circumferentially aligned with the piston and the mounting side friction material is offset in relation to the piston towards the leading part of the brake pad carrier, and wherein the brake pad carrier of the first air operated disc brake and the brake pad carrier of the second air operated disc brake are mirror images of one another.

11. The vehicle as defined in claim 10, wherein the sliding caliper of the first air operated disc brake is identical to the sliding caliper of the second air operated disc brake.

* * * * *